United States Patent [19]

Fluet

[11] 3,828,169

[45] Aug. 6, 1974

[54] APPARATUS FOR DIGITAL FREQUENCY MULTIPLICATION

[75] Inventor: Francis A. Fluet, Clarence, N.Y.

[73] Assignee: Westinghouse Electric Corporation, Pittsburgh, Pa.

[22] Filed: Oct. 26, 1973

[21] Appl. No.: 410,134

[52] U.S. Cl. .......................... 235/150.31, 235/152

[51] Int. Cl. .......................... G06j 1/02

[58] Field of Search .......... 235/150.31, 150.3, 152, 235/151.11; 318/570, 573

[56] References Cited

UNITED STATES PATENTS

| | | | |
|---|---|---|---|
| 3,674,999 | 7/1972 | Kelling | 235/150.31 X |
| 3,701,890 | 10/1972 | Dummermoth | 235/150.31 |
| 3,740,535 | 6/1973 | Szabo | 235/151.11 |
| 3,757,095 | 9/1973 | Kiwiet | 235/150.31 X |

*Primary Examiner*—Joseph F. Ruggiero
*Attorney, Agent, or Firm*—J. J. Wood

[57] ABSTRACT

Apparatus for digital frequency multiplication having a first AND logic gate adapted to receive an input pulse train having a frequency $f_{in}$, each pulse width defining one iteration. A numerator shift register with digital contents N, is connected to the input of the first AND logic gate, the latter gate, when enabled by the signal $f_{in}$, having the digital output N. A denominator shift register, having digital contents D is connected to the input of a second AND logic gate. An accumulator register coupled to the outputs of both AND gates, having digital contents R, is applied to a comparator, which compares the contents R with a datum level. The comparator delivers an output signal $f_o$ when R < the datum level and also delivers an enabling signal to the second AND logic gate which then has output D, the contents of the accumulator register becoming:

$$R_{n+1} = R_n - N + D$$

where $R_n$ = the contents of the accumulator register at the nth iteration where $n$ 0, 1, 2, 3, . . . $n$ and $R_{n+1}$ = the contents of the accumulator register at the $(n+1)$th iteration; and $$f_o = N/D\, f_{in}$$

Flexibility is provided by enabling N and D to be weighted to thereby vary $f_o$ using the same apparatus.

5 Claims, 7 Drawing Figures

| CYCLE COUNT | REMAINDER REGISTER | R | $f_o$ | $\frac{N}{D}=\frac{33}{111}$ |
|---|---|---|---|---|
| 0 | $R_0=0$ | 0 | 0 | |
| 1 | $R_1=R_0-N+0=0-33$ | -33 | 0 | |
| 2 | $R_2=R_1-N+D=-33-33+111$ | +45 | 1 | |
| 3 | $R_3=R_2-N=+45-33$ | +12 | 0 | |
| 4 | $R_4=R_3-N=12-33$ | -21 | 0 | |
| 5 | $R_5=R_4-N+D=-21-33+111$ | +57 | 1 | |
| 6 | $R_6=R_5-N=57-33$ | +24 | 0 | |
| 7 | $R_7=R_6-N=24-33$ | -9 | 0 | |
| 8 | $R_8=R_7-N+D=-9-33+111$ | +69 | 1 | |
| 9 | $R_9=R_8-N=+69-33$ | +36 | 0 | |
| 10 | $R_{10}=R_9-N=36-33$ | +3 | 0 | |
| 11 | $R_{11}=R_{10}-N=+3-33$ | -30 | 0 | |
| 12 | $R_{12}=R_{11}-N+D=-30-33+111$ | +48 | 1 | |
| 13 | $R_{13}=R_{12}-N=+48-33$ | +15 | 0 | |
| 14 | $R_{14}=R_{13}-N=15-33$ | -18 | 0 | |
| 15 | $R_{15}=R_{14}-N+D=-18-33+111$ | +60 | 1 | |
| 16 | $R_{16}=R_{15}-N=+60-33$ | +27 | 0 | |
| 17 | $R_{17}=R_{16}-N=27-33$ | -6 | 0 | |
| 18 | $R_{18}=R_{17}-N+D=-6-33+111$ | +72 | 1 | |
| 19 | $R_{19}=R_{18}-N=72-33$ | +39 | 0 | |

APPARATUS FOR DIGITAL FREQUENCY MULTIPLICATION

CROSS REFERENCE TO RELATED APPLICATION

See copending U.S. Pat. application Ser. No. 411,543 for APPARATUS FOR DIGITAL FREQUENCY SCALING filed in the name of Francis A. Fluet on Oct. 31, 1973 and assigned to the same assignor as the instant invention.

BACKGROUND OF THE INVENTION

1. Field of the Invention

This invention relates to digital frequency (or pulse rate) multiplication.

2. Discussion of the Prior Art

The invention herein describes and claims a means for frequency multiplication which is an improvement on the classic digital differential analyzer (DDA) described by R. K. Richards in "Arithmetic Operations in Digital Computers" at pages 303–305, published by D. Van Nostrand Co. Inc. (1955), and the DDA described and claimed in U.S. Pat. No. 3,740,535 to Szabo for "Numerical Contouring Control System."

In discussing the DDA, conventional nomenclature refers to one register as the integrand, and the other as the remainder. In this description the magnitude of the integrand will be referred to as the numerator (N) and the capacity of the remainder register as the denominator (D).

In the prior art implementations of the DDA, the denominator (D) term has a magnitude which is equal to the capacity of the remainder register. Additionally, DDA techniques require that the numerator term N be less than or equal to the denominator term D.

Conventional digital differential analyzers are usually binary or decimal, i.e., the remainder register is either a binary or a decimal storage device. Since the magnitude of the denominator term is equal to the capacity of the remainder register, this technique only permits frequency multiplication by binary or decimal fractions as determined by the initial selection of the remainder register. However, in the invention described in U.S. Pat. No. 3,740,535 to Szabo cited supra, this restriction is removed since the denominator term is a variable which can take on any magnitude within the capacity of the storage device. The invention described herein removes the restriction that N/D must be equal to or less than unity, and provides advantages in the flexibility for scaling both input and output frequencies.

SUMMARY OF THE INVENTION

Apparatus for digital frequency multiplication is disclosed in which a first AND logic gating means is adapted to receive an input pulse train having a frequency $f_{in}$, each pulse width defining one iteration. A numerator shift register means having digital contents N, is connected to the input of said first AND gating means, said first AND logic gating means, when enabled by said signal $f_{in}$, having the output N. Second AND logic gating means are included. A denominator shift register means having digital contents D, is connected to the input of said second AND logic gating means. Accumulator register means are coupled with the outputs of said AND gates, said accumulator register means having digital contents R. Comparator means are connected with said accumulator register means to compare said contents with a datum level, and for delivering an output signal $f_o$ when R < datum level and for delivering an enabling signal to said second AND gating means which then has an output D, the contents of the accumulator register means becoming:

$$R_{n+1} = R_n - N + D$$

where $R_n$ = the contents of the accumulator register means at the nth iteration where $n = 0, 1, 2, 3, 4 \ldots n$; and $R_{n+1}$ = the contents of the accumulator register means at the $(n+1)$th iteration; and $$f_0 = (N/D)\, f_{in}$$

Additionally, the contents N and D may be weighted so as to enable $f_0$ to be varied essentially with the same apparatus.

GENERAL DESCRIPTION

In one environment where the invention may be practiced—numerical contouring control—there are myriad requirements for flexibility, in changing frequencies (pulse rates) within the overall system. For example, in the numerical control of lathe operations, it may be necessary to take pulses which are a function of the rotational speed of the spindle, and generate so called pseudo-frequencies to provide gradations in manual override for the convenience of the machine operator.

Figure 6:
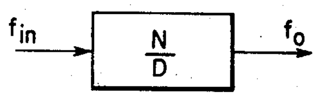
FIG. 6 is a block diagram of the generalized frequency multiplication apparatus.
Figure 7:
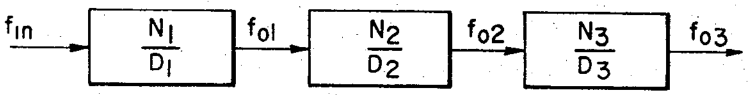
FIG. 7 is a block diagram showing the cascading of the apparatus for digital frequency multiplication to provide various outputs $f_0$, $f_{02}$, $f_{03}$ etc.

In FIG. 6 there is shown an overview of the frequency multiplication apparatus of the invention.

$$f_o = f_{in}\, (N/D)$$

where $f_{in}$ = the input frequency (pulse rate)

$f_o$ = the output frequency (pulse rate)

N = the contents of the numerator shift register

D = the contents of the denominator shift register

The improved digital frequency multiplier of this invention permits the generation of an output frequency $f_o$ higher than the input frequency $f_{in}$. Stated differently, N/D can be larger than one. The invention permits the scaling of the input frequency by a scale factor so as to enable input frequency $f_{in}$ to be effectively faster than the cyclic or iteration rate of the shift registers. Additionally, the invention enables the output frequency $f_o$ to be scaled by a factor to permit output frequencies $f_o$ faster than the iteration rate of the shift register. Finally, the frequency multiplier of the invention may be duplicated and cascaded (i.e., $f_o$ becomes $f_{in}$ for the succeeding frequency multiplier) so as to provide any frequency required.

These improvements and advantages will be more readily appreciated as this description proceeds to a more detailed consideration of the invention.

DESCRIPTION OF A PREFERRED EMBODIMENT

Figure 1:
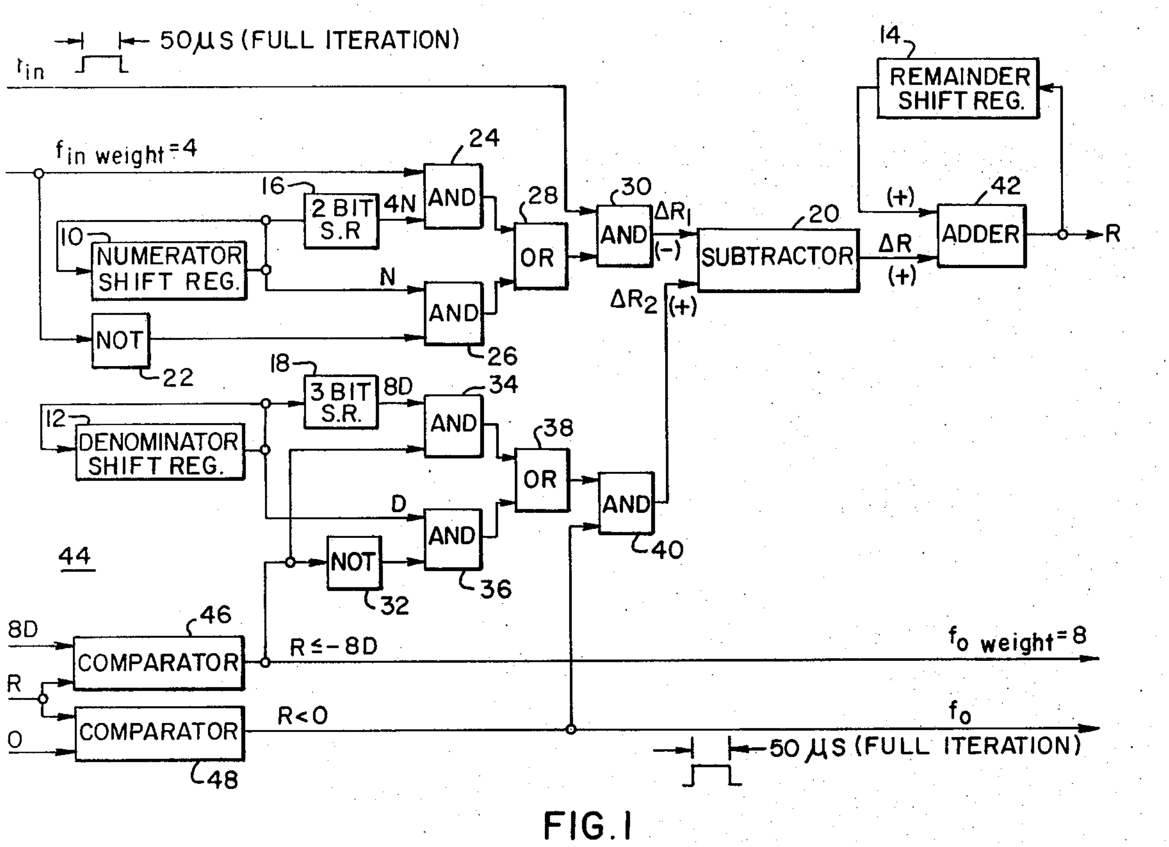
FIG. 1 is a block diagram depicting the apparatus for digital frequency multiplication in accordance with the invention.

Referring now to FIG. 1, this embodiment of the invention comprises three binary shift registers 10, 12, and 14 of identical capacity to store the magnitude of the numerator N, the denominator D and the intermediate remainder R. Two additional shift registers 16 and 18 are connected as shown, to multiply the N and D magnitudes so as to weigh or scale the input and output frequencies respectively. The number of bits in the shift registers 16, 18 determines the scaling factor. In the illustrative embodiment register 16 is a two bit shift register producing an output 4N, while register 18 is a three bit shift register producing an output 8D.

The signal flow path from the numerator shift register 10 to a subtractor 20 includes NOT logic element 22, AND logic gates 24, 26, OR logic gate 28, and AND logic gate 30. Similarly, the signal path flow from the denominator shift register 12 to the subtractor 20 includes NOT logic gate 32, AND logic gates 34, 36, OR logic gate 38, and AND logic gate 40.

The output ($\Delta R$) of the subtractor 20 is applied to an ADDER 42, the output of which is applied to the remainder shift register 14. The adder 42 and the remainder shift register constitute the accumulator register (unnumbered).

An automatic decision means shown generally at 44 controls the scale or weight of the output frequency $f_o$ and additionally assists in the logic signal flow from the N and D shift registers toward the subtractor 20. In the illustrative embodiment two comparators 46, 48 serve as decision elements. (It should be understood that only two comparators are shown in the interest of simplicity; in any practical embodiment the number of comparators used would depend upon the variety of output weights desired.)

OPERATION OF THE EMBODIMENT

At the beginning of operations, the system is initialized, i.e., the remainder register 14 is cleared, and the N and D magnitudes are loaded into the registers 10 and 12 respectively. As may be seen from FIG. 3, the N/D ratio will have a magnitude which will produce the desired output frequency viz.

$$f_0 = f_{in}\ (N/D)$$

In a typical operation the N, D and R shift registers are 25 bit binary shift registers, all shifting in synchronism, the least significant bit (LSB) first, at a bit rate of 2 microseconds per bit. Therefore one iteration requires a 50 microsecond period beginning from when the LSB just appears at the output of the shift register until just before it reappears 50 microseconds later.

The data input line $f_{in}$ is in a logical ONE for the entire iteration period. This would limit the input frequencies $f_{in}$ to 20,000 pulses a second (20 $KH_Z$). In order to overcome this limitation one or more data input control lines are used. In the illustrative embodiment a weight of four is selected ($f_{in}$ weight = 4) so that the effective maximum input frequency becomes 80$KH_Z$. The input frequency can be achieved by placing a pulse accumulator or buffer between the actual input frequency and the $f_{in}$ data line.

Figure 2:
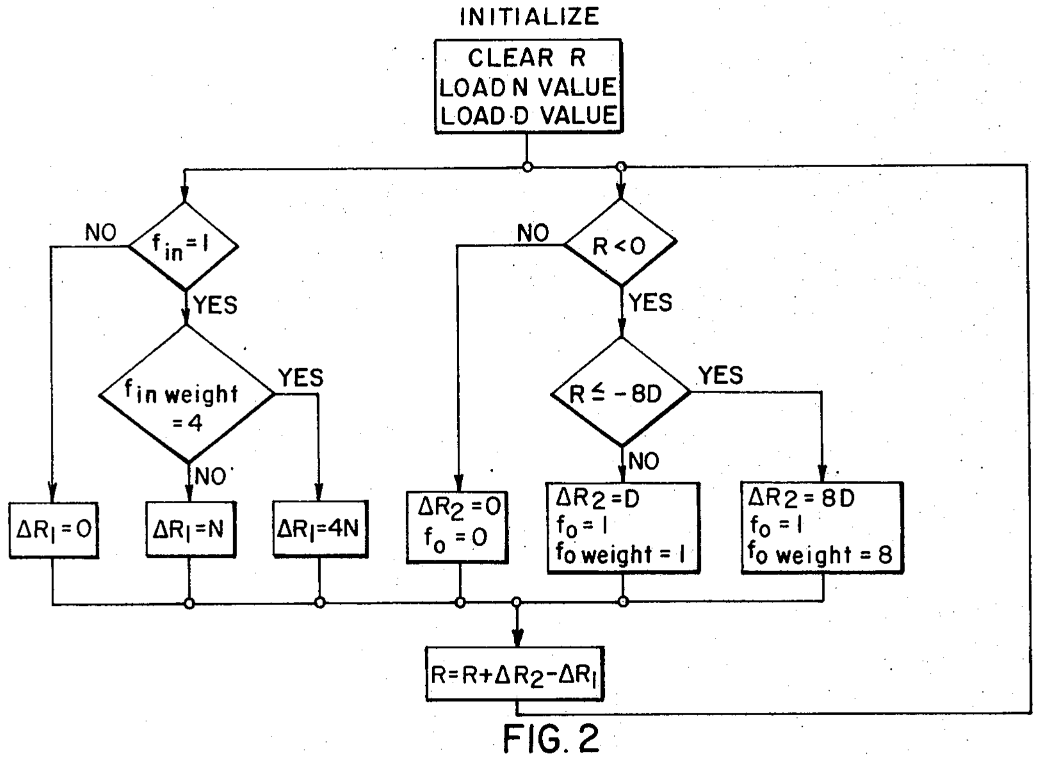
FIG. 2 is a flow diagram used in explaining the operation of the apparatus of FIG. 1.

The flow chart of FIG. 2 depicts the operation of the circuitry of FIG. 1. There are two independent paths taken through the flow chart every iteration, representing the effect on the input frequency $f_{in}$ and the output frequency $f_0$ on the remainder. Thus depending upon the input frequency $f_{in}$, 0, N or 4N will be subtracted from the remainder register 14, and depending upon the output frequency, 0, D or 8D will be added to the remainder register 14. Whenever the remainder magnitude becomes negative, an output pulse in generated, and D or 8D is added to the remainder register 14. If one uses output scaling of 1 and 8, the remainder magnitude is compared to −8D. If the remainder magnitude is more negative than minus eight times D(−8D), the output scale control signal $f_{out}$ weight = 8 becomes a logical ONE, and 8D is added to the remainder register 14 at the same time that $f_0$ pulses to a logic ONE for an entire iteration. Thus the output frequency has an effective maximum of 160KHz although the iteration rate is only 20KHz. This arrangement provides for myriad combinations of input frequencies larger than the iteration rate and values of N larger than D. The data information in the numerator shift register 10 is recirculated as indicated, and sent to the AND gate 26 as input N, where, after passing through the two bit shift register 16, it is sent to AND gate 24 as 4N. If $f_{in}$ weight = 4 is not present, i.e., a logic ZERO, the ZERO is inverted by the NOT gate 22 and AND logic gate 26 is enabled. Conversely, if $f_{in}$ weight is present, i.e., a logic ONE, the NOT logic gate 22 inverts the signal to logic ZERO, and AND gate 26 will not pass. AND logic gate 30, connected to OR logic gate 28 will pass either N or 4N to AND gate 30. The output of the AND gate 30: $-\Delta R_1$ is applied to the subtractor 20. The magnitude of $-\Delta R_1$ is thus:

a. 0 or
b. N or
c. 4N

The generation of the signal $+\Delta R_2$ is as follows: The denominator register 12 applies D to the AND logic gate 36, and after passing through the 3 bit shift register 18, applies 8D to AND logic gate 34. The automatic decision means 44 compares the contents of the remainder register R with 0 and 8D.

If R is not less than 0, then a logic ZERO appears as one input to AND gate 40 and nothing passes to the subtractor 20. Stated differently, $\Delta R_2 = 0$ and $f_o$ is 0. If R is less than 0, a logic ONE from comparator 48 appears as one input to AND logic gate 40. Comparator 46 makes a further decision: is R equal to or less than −8D? If the answer is in the negative, a logic ZERO is sent to AND logic gate 34 and to NOT logic gate 32. AND logic gate 34 is disabled, and AND logic gate 36 is enabled. OR logic gate 38 of course passes a signal when either one of its inputs is present, and D is sent to AND logic gate 40. $\Delta R_2$ becomes now equal to D and $f_o$ is a ONE with a weight of one. If R is equal to or less than −8D, then comparator 46 sends out a logic ONE: to AND gate 34, to $f_0$ weight=8, and to NOT logic gate 32. As may be seen from a study of FIG. 1, the presence of this logic ONE enables AND gate 34 and disables AND gate 36 because of the inversion of the logic ONE by NOT logic gate 32. The number 8D is thus passed to the subtractor 20, i.e., $\Delta R_2 = 8D, f_0 = 1, f_0$ weight = 8.

The operation of the frequency multiplication apparatus will be better appreciated by consideration of an example. In order to further simplify the problem we shall treat with decimals rather than numbers in binary form, with the understanding that in practice the circuitry will be treating with numbers in binary form. Further, in order to further simplify the arithmetic, a case is selected so that $f_{in}$ weight is not present and R will not be $\leqslant -8D$.

Let R be cleared, i.e., equal to 0, and let N = 30 and D = 111

$$f_0 = 20KHz \times 33/111$$
$$\doteq 5.95KHz$$

As we begin R is 0. $\Delta R_1 = N$; $\Delta R_2 = 0$ because R is not less than 0, $f_{out}$ is zero.

Cycle (1)

$$R_1 = R_0 - N$$
$$= 0 - 33$$
$$= -33$$

Cycle (2) The remainder register is now −33. R is less than 0, $f_{out} = 1$ and $\Delta R_2 = D = 111$ $$R_2 = R_1 - N + D$$
$$= -33 - 33 + 111$$
$$= +45$$

Cycle (3) R is now 45, hence not less than 0. Therefore $f_0 = 0$ and $\Delta R_2 = 0$ $$R_3 = R_2 - N$$
$$= +45 - 33$$
$$= 12$$

Figures 3, 4:
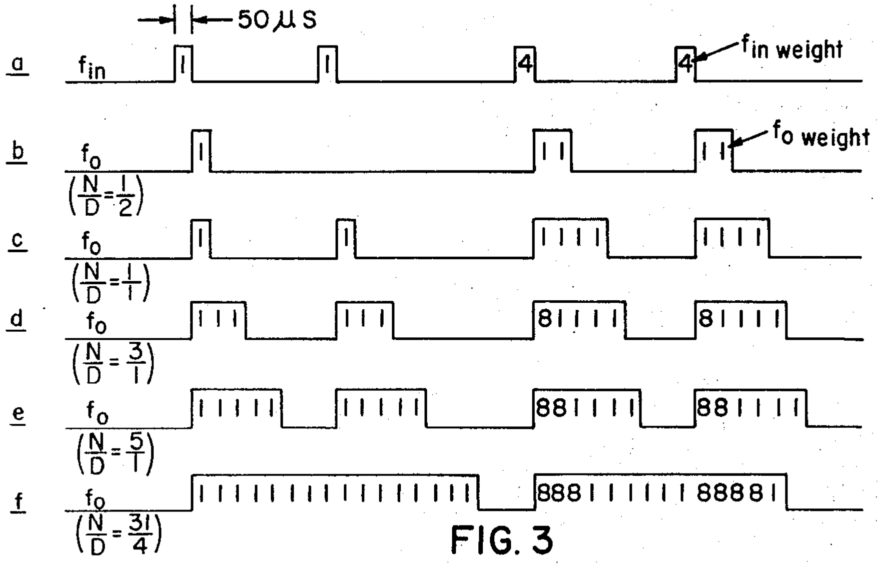
FIG. 3 is a timing chart for various combinations of input frequencies and N/D ratios.
FIG. 4 is a table of a hypothetical operation depicting the changing contents of the accumulator register and the generation of the output pulses $f_0$.
Figure 5:
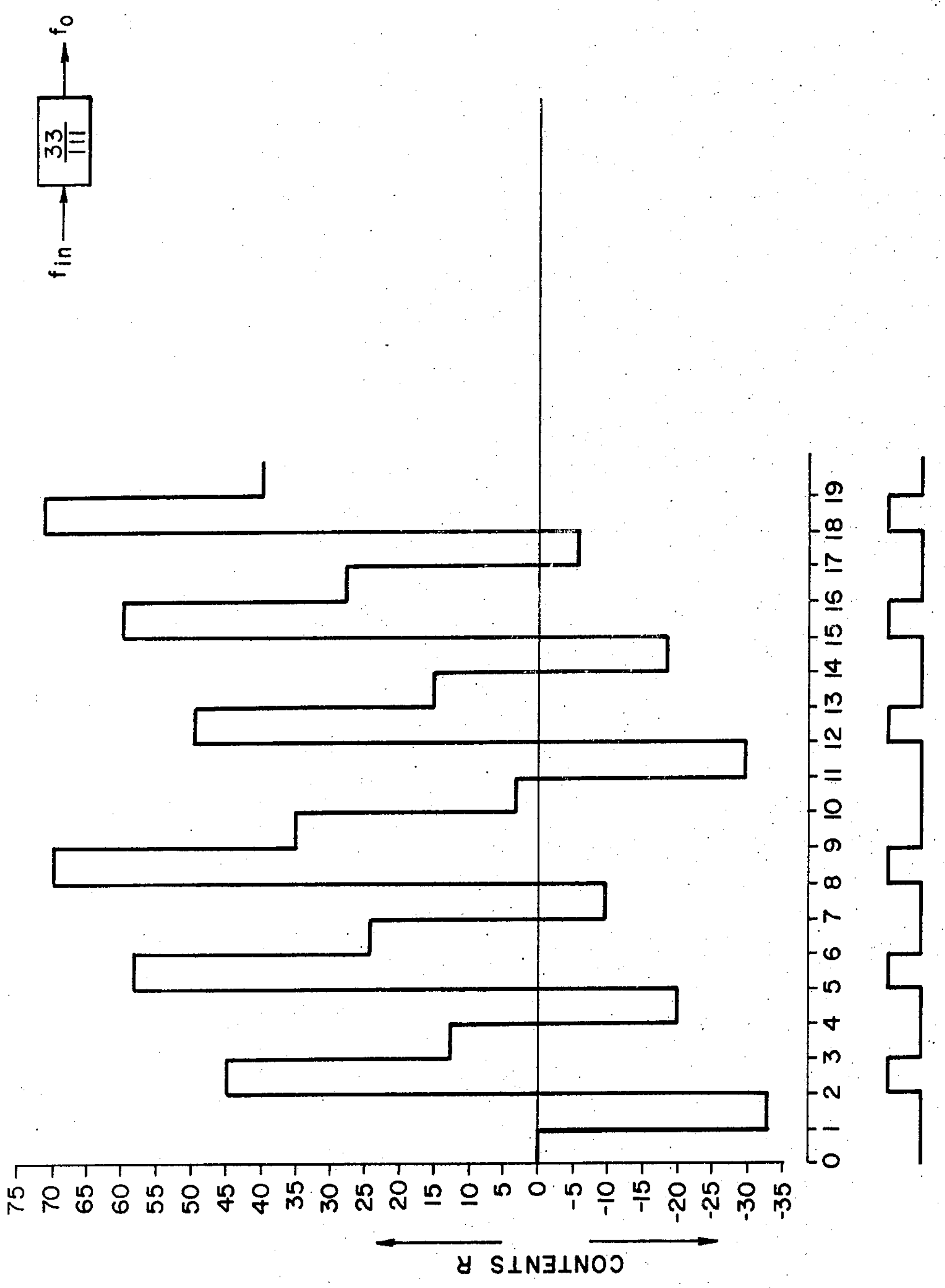
FIG. 5 is a diagram of accumulator register contents R vs cycle counts, and showing the development of the output $f_0$.

It should now be apparent how the table of FIG. 4 is developed. In FIG. 5 the relationship of the contents of the accumulator register to $f_0$ is delineated.

What is claimed is:

1. Apparatus for digital frequency multiplication comprising:

a. first AND logic gating means adapted to receive an input pulse train having a frequency $f_{in}$, each pulse width defining one iteration;

b. numerator shift register means having digital contents N, connected to the input of said first AND gating means, said first AND logic gating means when enabled by said signal $f_{in}$ having the output N, c. second AND logic gating means;

d. denominator shift register means having digital contents D connected to the input of said second AND logic gating means;

e. accumulator register means coupled to the outputs of said AND gates and having digital contents R;

f. comparative means connected to said accumulator register means to compare said R with a datum level and for delivering an output signal $f_0$ when R < datum level and for delivering an enabling signal to said second AND gating means which then has an output D, the contents of the accumulator register means becoming:

$$R_{n+1} = R_n - N + D$$

where $R_n$ = the contents of the accumulator register at the nth iteration where $n = 0, 1, 2, 3, \ldots n$;

$R_{n+1}$ = the contents of the accumulator register means at the $(n + 1)$th iteration; and $$f_0 = (N/D)\, f_{in}$$

2. Apparatus for digital frequency multiplication comprising:

a. first AND logic gating means adapted to receive an input pulse train having a frequency $f_{in}$, each pulse width defining one iteration;

b. numerator shift register means having digital contents N;

c. first weighting means connected to the output of said numerator shift register means for delivering weighted numerator digital contents $K_1N$ where $K_1$ may be any number rational or irrational;

d. first means for switching connected to receive the digital contents N, $K_1N$, and connected to the input of said first AND logic gating means for delivering N or $K_1N$ to said first AND logic gating means upon receipt of an enabling signal;

e. second AND logic gating means;

f. denominator shift register means having digital contents D;

g. second weighting means connected to the output of said denominator shift register means for delivering weighted denominator digital contents $K_2D$ where $K_2$ may be any number rational or irrational;

h. second means for switching connected to receive the digital contents D, $K_2D$, and connected to the input of said second AND logic gating means for delivering D or $K_2D$ to said second AND logic gating means upon receipt of an enabling signal;

i. accumulator register means coupled to the outputs of said AND logic gates, and having digital contents R;

j. comparator means connected to said accumulator register means to compare said R with 0 and with $K_2D$, and for delivering an output signal $f_0$ when R < 0 or R < $K_2D$, and for delivering an enabling signal to said second AND gating means, where R 0 the contents of the accumulator means becoming:

$$R_{n+1} = R_1 - N \text{ (or } K_1N) + D \text{ (or } K_2D)$$

where $R_n$ = the contents of the accumulator register at the nth iteration, $n = 0, 1, 2, 3, \ldots n$;

$R_{n+1}$ = the contents of the remainder register at the $(n + 1)$th iteration and $$f_0 = [N \text{ (or } K_1N)/D \text{ (or } K_2D)] \times f_{in}$$

3. Apparatus for digital frequency multiplication according to claim 2 in which said first weighting means is an $n$ bit shift register where $n$, may have 2, 3, 4 . . . $n$ bits and said second weighting means is an $n$ bit shift register where $n$ may have 2, 3, 4 . . . bits.

4. Apparatus for digital frequency multiplication according to claim 1 in which said accumulator register means comprises an adder and a remainder shift register, the output of said remainder shift register being fed back as a first input to said adder, a second input to said adder being the algebraic summation of the output of said first and second AND logic gating means, the output of said adder being the digital contents R.

5. Apparatus for digital frequency multiplication according to claim 2 in which said accumulator register means comprises an adder and a remainder shift register, the output of said remainder shift register being fed back as a first input to said adder, a second input to said adder being the algebraic summation of the outputs of said first and second logic gating means, the output of said adder being the digital contents R.

* * * * *